United States Patent
Luciani

(10) Patent No.: US 6,331,984 B1
(45) Date of Patent: Dec. 18, 2001

(54) METHOD FOR SYNCHRONIZING NETWORK ADDRESS TRANSLATOR (NAT) TABLES USING THE SERVER CACHE SYNCHRONIZATION PROTOCOL

(75) Inventor: James V. Luciani, Groton, MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/137,571

(22) Filed: Aug. 21, 1998

(51) Int. Cl.$^7$ .............................. H04L 12/50; H04L 12/56
(52) U.S. Cl. ............................................ 370/401; 370/503
(58) Field of Search .................... 370/503, 254, 370/255, 256, 400, 401, 475, 465, 466, 351–360, 389, 391–392, 396, 410; 709/220, 221, 222, 200, 201, 203

(56) References Cited

U.S. PATENT DOCUMENTS

| 5,825,772 | * 10/1998 | Dobbins et al. | 370/396 |
| 6,141,680 | * 10/2000 | Cucchiara | 709/201 |
| 6,189,043 | * 2/2001 | Buyukkoc et al. | 709/241 |

OTHER PUBLICATIONS

Egevang, K. and Francis, P., "The IP Network Address Translator (NAT)", Request for Comments 1631, May 1994, 8 pages.

Luciani et al., "NBMA Next Hop Resolution Protocol (NHRP)", Request for Comments 2332, Apr. 1998, 41 pages.

Luciani et al., "Server Cache Synchronization Protocol (SCSP)", Request for Comments 2334, Apr. 1998, 32 pages.

Luciani, J., "A Distributed NGRP Service Using SCSP", Request for Comments 2335, Apr. 1998, 6 pages.

* cited by examiner

Primary Examiner—Ajit Patel
(74) Attorney, Agent, or Firm—Blakely Sokoloff Taylor & Zafman LLP

(57) ABSTRACT

A method for distributing Network Address Translator (NAT) translation table information among border routers associated with a routing domain using the Server Cache Synchronization Protocol (SCSP). The NAT translation table information is included in one or more Cache State Advertisement Summary (CSAS) records in a SCSP Cache State Advertisement (CSA) message. Network address information, i.e., local network address and corresponding global network address, are transmitted in the CSA messages and exchanged between a group of interconnected SCSP capable border routers so that the border routers can maintain identical NAT translation tables as necessary to forward data packets according to the NAT forwarding paradigm.

12 Claims, 2 Drawing Sheets

| LOCAL IP ADDRESS | PORT | GLOBAL IP ADDRESS | PORT |
|---|---|---|---|
| 10.0.0.1 | 1 | 111.0.0.1 | 3 |
| 10.0.0.4 | 5 | 111.0.1.8 | 2 |
| 10.0.0.22 | 8 | 111.0.2.3 | 6 |
| ⋮ | ⋮ | ⋮ | ⋮ |

METHOD FOR SYNCHRONIZING NETWORK ADDRESS TRANSLATOR (NAT) TABLES USING THE SERVER CACHE SYNCHRONIZATION PROTOCOL

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to data communications. In particular, the present invention is related to a method for synchronizing Network Address Translator (NAT) translation tables, or databases, using the Server Cache Synchronization Protocol (SCSP).

2. Description of the Related Art

The Transport Control Protocol/Internet Protocol (TCP/IP) suite of protocols is used in many of today's internetworks (internets). A TCP/IP-based internet provides a data packet switching system for communication between nodes (e.g., end-user workstations, servers, network devices, etc.) connected to an internet. With reference to FIG. 1, in accordance with the well known International Standards Organization (ISO) Open Systems Interconnection (OSI) seven-layer conceptual model for data networking, Network layer devices known as routers or switches select a path and forward, i.e., route, IP datagrams between nodes, or hosts, connected to the internet. For example, internet 100 comprises multiple networks, including Local Area Networks (LANs) 110, 120 and 170, and Wide Area Network (WAN) 180, interconnected by routers 130, 140, 150 and 160. The routers route IP datagrams, for example, between nodes 111, 112, 121, 122, and 171 via the multiple networks in the internet.

In traditional destination address based routing, a source node, e.g., node 111, transmitting an IP datagram to a destination node, e.g., node 121, specifies as a destination IP address the IP address of the destination node in the IP datagram. The IP datagram is encapsulated in a physical frame, or packet, and sent to the router attached to the same network (LAN 110) as the source node, e.g., router 130 or router 140. The router receiving the frame, in turn, extracts the IP datagram, and determines the destination IP address. The router selects the next hop router enroute to the destination node, e.g., router 160, and again encapsulates the datagram in a physical frame for transmission to the next hop router. This process continues until the IP datagram reaches the network to which the destination node is connected, i.e., LAN 120, wherein the datagram is delivered to the destination node 121.

Routing tables on each router store information about what networks are reachable, either directly or via adjacent routers. When a router receives an IP datagram, it compares the network portion of the IP destination address in the datagram, referred to herein as the address prefix, with the network reachability information stored in its routing table. If a match is found, the router sends the datagram over the appropriate, directly attached network to the next hop router through which the destination network is reachable, or directly to the node, if the destination network is directly attached to the router.

In the event of topological changes to network 100, network reachability information may be maintained up to date, automatically, through the use of an interior gateway protocol (IGP), such as the well known Open Shortest Path First (OSPF) Version 2 TCP/IP internet routing protocol, the specification of which is set forth in the Internet Standard Request For Comments (RFC) 1583, March, 1994. In addition to exchanging network reachability information between routers, the OSPF protocol routes IP datagrams over one of possibly multiple routes based on the destination IP address and IP Type of Service specified in the IP header of the datagrams. Further details of the well known OSPF version 2 routing protocol may be found in RFC 1583.

Growth of the Internet, as well as private internets, has placed demands not only on bandwidth requirements, but also the internet routing protocols and the available IP address space. Traditional destination address based routing using OSPF version 2 generally allows traffic to be routed based only on destination IP address and IP type of service. New approaches to routing and IP address allocation have been sought to improve routing functionality, scalability and control as changes in internet traffic patterns and volume emerge.

A particular problem for the Internet, and for which a number of proposals providing short-term and long-term solutions have been developed, is running out of unique IP addresses. One short-term proposal is set forth in the Informational Request For Comments (RFC) 1631, May, 1994, entitled "The IP Network Address Translator (NAT)." The proposal is based on reusing existing IP addresses by placing NAT software, and NAT tables or databases, at each router between routing domains. The NAT table at each participating router comprises pairs of local, reusable IP addresses for use in data packets transmitted within local routing domains, and assigned, globally unique IP addresses for use in data packets transmitted outside local routing domains, that is, over the Internet.

Briefly, network address translation functions as follows. With reference to FIG. 1, domains A, B, C and D represent separate routing domains. Routing domains A and B are stub, or leaf, domains, that only handle traffic originating from or destined to hosts in the routing domain, whereas routing domains C and D route traffic originating from or destined to hosts in the same or other routing domains. Most of the traffic in leaf routing domains is local, that is, at any given time, generally a small percentage of traffic originating from or destined to hosts in a leaf routing domain is transmitted outside the routing domain. Therefore, the local IP addresses assigned to hosts in one leaf routing domain may be reused by hosts in another leaf routing domain without IP address conflict. A local IP address assigned to a host in a leaf routing domain needs only be translated to a globally unique IP address when the host communicates with a host outside the leaf routing domain. Thus, only a subset of the local IP addresses used in a leaf routing domain are translated to the globally unique IP addresses required when transmitting outside the leaf domain, thereby averting IP address depletion in the Internet.

Routers that provide ingress to or egress from a leaf routing domain are known as border routers. Network Address Translator (NAT) software, including NAT translation tables, is installed at these routers to provide the network address translator functionality. For example, routers 130, 140 and 150 are border routers for leaf routing domains that may utilize reusable local IP addresses.

According to the proposed NAT solution, host 111 can use a local IP address as the destination IP address when transmitting an IP datagram to a host in the same leaf routing domain, e.g., host 112 in routing domain A. However, host 111 must use a globally unique IP address as the destination IP address when sending an IP datagram to a host outside leaf routing domain A, e.g., host 121 in leaf routing domain B, via either of routers 130 and 140, say router 130. Router 130 checks its routing table, locates the route for the destination network specified by the globally unique destination IP address, and forwards the IP datagram to the next hop router via WAN 180, but not before replacing the local IP address of host 111 in the source IP address field of the datagram with a globally unique IP address. Ultimately, router 150 receives the IP datagram, and using its NAT software and associated data structures, translates the globally unique destination IP address with the local IP address assigned to host 121 in routing domain B before forwarding the datagram to host 121.

On the return path, the same process occurs: host 121, for example, transmits to router 150 an IP datagram destined for host 111 in routing domain A, specifying the globally unique IP address for the host, as determined from the source IP address field in the IP datagram that host 121 received from host 111. The source IP address field in the return IP datagram contains the local IP address for host 121. Router 150 replaces the local IP address of host 121 in the source IP address field in the datagram with the appropriate globally unique IP address and forwards the datagram to the next hop router 160 via LAN 170. Upon receipt of the return IP datagram at either of router 130 or 140, say router 140, the globally unique destination IP address for host 111 is translated to a locally assigned IP address for host 111, and the datagram forwarded to host 111.

As can be appreciated, and as pointed out in RFC 1631, it is very important, if multiple border routers are coupled to a particular leaf routing domain, that the network address translation tables for each router are identical. In the above example, note that router 130 accessed its NAT translation table to translate the locally defined source IP address for host 111 to a globally unique source IP address. Router 140 performed the same but opposite translation when receiving an IP datagram from host 121 via WAN 180, destined for host 111: it exchanged the globally unique IP address specified in the destination IP address field in the datagramn to a local IP address associated with host 111 before forwarding the datagram to host 111. If the translation tables for routers 130 and 140 do not provide identical mappings between local and globally unique addresses, there is a likelihood that IP datagrams originating from or destined to hosts in leaf routing domain A do not reach the proper destination. Moreover, because the limited set of globally unique IP addresses are shared by the hosts in the routing domain and, therefore, the mappings between the globally unique IP address and the local IP address change over time depending on which hosts are communicating over the Internet at any given time, it is important that routers 130 and 140 update the other as changes occur to their respective NAT translation tables. However, RFC 1631 makes no provision for such distribution of NAT translation tables between common border routers. What is needed, therefore, is a method of distributing such inforration so that the NAT translation tables between common border routers are synchronized.

BRIEF SUMMARY OF THE INVENTION

A method is described for synchronizing Network Address Translator (NAT) translation tables among routers using the Server Cache Synchronization Protocol (SCSP) Cache State Advertisement (CSA) messages. Network address translator information, i.e., ingress address, ingress port, egress address and egress port, is transmitted via the SCSP CSA messages between a group of interconnected SCSP capable routers so that the routers can maintain their NAT translation tables as necessary to exchange data packets with routers in other routing domains.

BRIEF SUMMARY OF THE SEVERAL VIEWS OF THE DRAWINGS

The present invention is illustrated by way of example and not limitation in the following figures, in which.

DETAILED DESCRIPTION OF THE INVENTION

Figure 1:
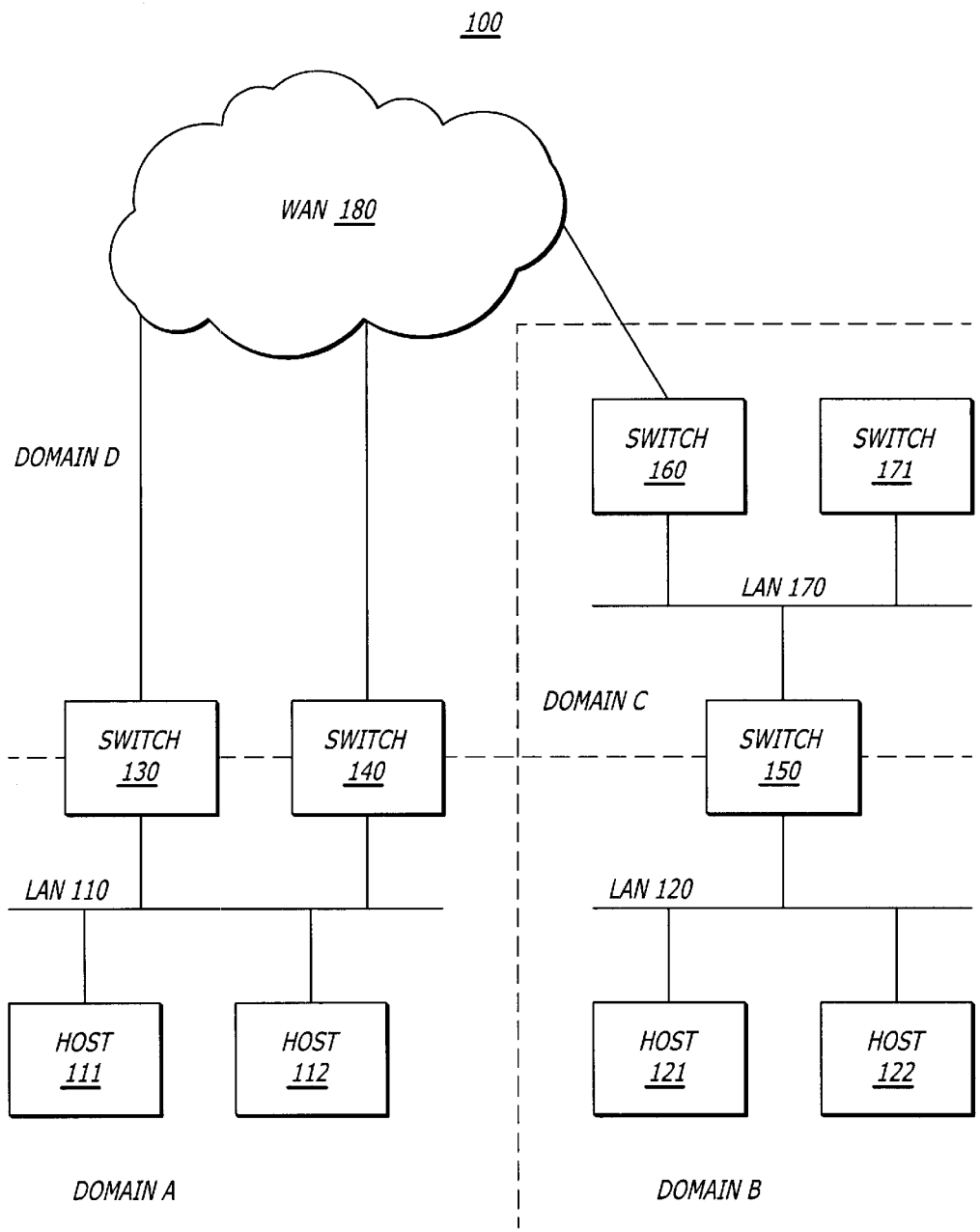
FIG. 1 is a diagram of a data communications internetwork.

Described is a method for distributing Network Address Translator (NAT) translation table information within a routing domain using the Server Cache Synchronization Protocol (SCSP) Cache State Advertisement (CSA) messages, defined in an Internet standards track protocol for the Internet community, the specification for which is set forth in the Internet Standard Request For Comments (RFC) 2334. In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention. For example, specific details are not provided as to whether the method is implemented in a router as a software routine, hardware circuit, firmware, or a combination thereof.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Embodiments of the invention may be represented as a software product stored on a machine-readable medium (also referred to as a computer-readable medium or a processor-readable medium). The machine-readable medium may be any type of magnetic, optical, or electrical storage medium including a diskette, CD-ROM, memory device (volatile or non-volatile), or similar storage mechanism. The machine-readable medium may contain various sets of instructions, code sequences, configuration information, or other data. For example, the procedures described above for synchronizing network address translation tables can be stored on the machine-readable medium. Those of ordinary skill in the art will appreciate that other instructions and operations necessary to implement the described invention may also be stored on the machine-readable medium.

The present invention is concerned with the particular method or protocol for exchanging Network Address Translator (NAT) translation table information between adjacent routers. While the description that follows specifically addresses the method as it applies to IP destination address based routing, it is appreciated by those of ordinary skill in the art that the method is generally applicable to distribution of network address translation information between networks that utilize different network addressing schemes. For example, the method is equally applicable in translating local Internetwork Protocol exchange (IPX) addresses to global IPX addresses, or translating addresses from one format to another as required for communication between heterogeneous network architectures, protocols and addressing schemes.

Figures 2, 3:
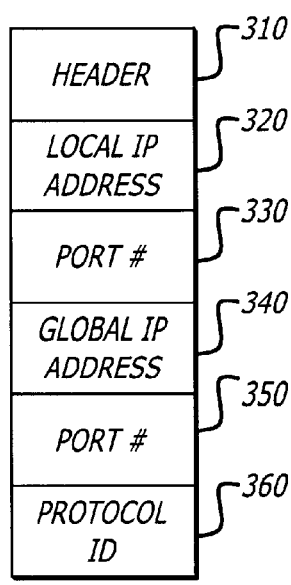
FIG. 2 illustrates a format for a NAT translation table maintained in a border router.
FIG. 3 illustrates a format for a SCSP CSA message comprising a NAT translation table entry for transmission to a common border router in accordance with an embodiment of the present invention.

FIG. 2 illustrates an embodiment of the NAT translation table 200 that resides in a border switch or router. The entries shown in FIG. 2 provide mappings as necessary to translate a local IP address 210 in a leaf routing domain to a globally unique IP address 220, and vise versa. In the described embodiment, the address translation is effected at the Network layer, e.g., from a local IP address to a globally unique IP address. Since multiple Transport layer sessions may exist at any moment in time for a particular host to which an IP address is assigned, the table further specifies the Transport layer port number (e.g., User Datagram Protocol (UDP) or Transport Control Protocol (TCP) port number) associated with the local and globally unique IP addresses at 205. As explained below, an additional field is inserted in the synchronization message transmitted between common border routers to indicate the upper layer, e.g., Transport layer protocol with which the port numbers are associated. As described above in the background description of the invention, if a border router receives an IP datagram having a globally unique destination IP address, or local source IP address, the router checks its NAT translation table for the respective local destination IP address or globally unique source IP address, and exchanges such before forwarding the IP datagramn. If there are multiple border routers for a given leaf routing domain, the NAT translation tables need to be synchronized. A protocol for doing such is described below.

An embodiment of the present invention distributes Network Address Translator (NAT) translation table information in the above described manner using Cache State Advertisement (CSA) records contained in a Cache Status Update (CSU) request message provided by the Server Cache Synchronization Protocol (SCSP). Acknowledgment by a router that it has received the distributed NAT translation table information is effected using SCSP CSU reply messages. In general, the SCSP is a generic flooding protocol that provides for synchronizing the contents of separate caches maintained among multiple distributed server entities in a server group so that the servers actively mirror state information. The cache in each server of the server group contains state information about the clients being served by the servers. Thus, SCSP may be used by NAT to ensure accurate, up to date mapping of local IP addresses to globally unique IP addresses between common border routers for a given routing domain. The SCSP provides cache synchronization for server entities in a server group (as determined by a Server Group ID-SGID) on a per protocol instance basis (as determined by a protocol ID-PID). That is, an instance of SCSP is provided for each instance of a protocol executing on a server. Thus, and as pointed out in RFC 2334, SCSP is designed for use in conjunction with a protocol that depends on the synchronization primitives defined by SCSP, and each instance thereof is defined by a SGID/PID pair.

In the present invention, NAT translation table synchronization between common border routers is accomplished utilizing SCSP Cache State Advertisement (CSA) messages. That is, the contents (partial or all) of the NAT is translation table maintained by a border router, e.g., 130, is transmitted to a common border router, e.g., 140, via the synchronization mechanisms of SCSP. From the client/server perspective of SCSP, common border routers are "server entities" belonging to the same "server group", within which "cache", i.e., NAT translation table, synchronization is provided by the SCSP. The SCSP provides border router NAT translation table synchronization and replication for distributed NAT translation tables between a server and a client in a routing domain. In the example network illustrated in FIG. 1, common border routers 130 and 140 for routing domain A are each a "server" for the other and a "client" of the other. Additionally, each border router must be aware of the other common border routers for a given routing domain. This can be accomplished, for example, via static configuration of the IP addresses of each of the common border routers in each border router, or through an autoconfiguration protocol.

In terms of the SCSP, all border routers belonging to a routing domain, e.g., routers 130 and 140 of routing domain A, belong to a server group (SG). The SG is identified by a server group identifier (SGID) included in SCSP packets exchanged between members or servers of the SG. A unique protocol ID (PID) is assigned to the NAT protocol and further included in SCSP packets to specifically indicate the packets are synchronizing the contents of NAT translation tables for the NAT protocol.

According to the present invention, SCSP Cache State Advertisement (CSA) messages are used by a "server" border router to synchronize its NAT translation table with that of a "client" border router. Thus, router 130 sends CSA messages to router 140 to synchronize its NAT translation table with that of router 140, and router 140 likewise sends CSA messages to router 130 to synchronize its NAT translation table with that of router 130. The CSA messages may be sent in association with any number of events, such as when a router boots, reboots, or when the router detects a change/updates its own NAT translation table, to synchronize NAT translation tables with common border routers. As for the latter event, the synchronization may occur immediately upon a router updating its own NAT translation table, either before transmitting an IP datagram that reflects the new mapping in the NAT translation table, or after transmitting the IP datagram, the tradeoff being timeliness of synchronization between NAT translation tables versus transmission latency of the IP datagram.

As a service protocol that provides synchronization mechanisms for other protocols, the SCSP is defined in two parts: a protocol independent part, which relates to the SCSP itself, and a "client/server protocol specific part that relates to the protocol using, or being serviced by, the SCSP. SCSP messages are IEEE 802.2 Logical Link Control/Sub Network Access Protocol (LLC/SNAP) encapsulated with an LLC value of AAAA03 (hexadecimal) and an Organizationally Unique Identifier (OUI) value of 00005E (hexadecimal). The format of the protocol independent part of an SCSP formatted message, including the SCSP "fixed part", "mandatory common part" and "CSA record" format are described in RFC 2334.

In general, SCSP CSA records provide the current state of a cache entry to servers in the same server group. Thus, according to the present invention, CSA records provide the current state of NAT translation table entries in a border router to other border routers for a given routing domain. CSA records contain a Cache State Advertisement Summary (CSAS) record header followed by the client/server protocol specific part, e.g., a NAT specific part. Information in the CSAS record is compared against an appropriate cached entry in a server receiving the CSAS record, and if the information is considered to be newer than the information in the cached entry, the contents of the CSA record specifically relating to the client/server protocol specific part, e.g., comprising a NAT translation table entry, replaces the cached entry.

With reference to FIG. 3, following the protocol independent part of an SCSP CSA message, collectively referred to herein as header 310, is the NAT translation table information contained in fields 320–350. The first field 320 contains a local IP address, followed by a second field 320 that indicates the Transport layer port (UDP or TCP) for the session. The following field 340 contains a corresponding globally unique IP address, which in turn, is also associated with a UDP or TCP port number specified in field 350. In an alternative embodiment, the order of fields may be reversed or different. An additional field, the protocol identification field 360, identifies the upper layer protocol, e.g., TCP or UDP in the described embodiment, with which the port numbers are associated. Although FIG. 3 shows just information relating to a particular NAT translation table entry, it is appreciated that multiple NAT translation table entries may be included in the synchronization message.

As can be appreciated by those of ordinary skill in the art, additional information can be included in the protocol specific port besides NAT translation table information. For example, vendor specific information may be included so that common border routers of the same vendor type or model can optimize communication and/or configuration parameters between each other.

What is claimed is:

1. A method for a border router associated with a routing domain to distribute network address translator (NAT) translation table information to interconnected border routers in the routing domain, comprising:
   a) inserting the NAT translation table information into a Server Cache Synchronization Protocol (SCSP) Cache State Advertisement (CSA) packet; and
   b) distributing the SCSP CSA packet to the interconnected border routers.

2. The method of claim 1, wherein inserting the NAT translation table information into a SCSP CSA packet comprises inserting the NAT translation table information into a protocol specific part of the SCSP CSA packet.

3. The method of claim 2, wherein inserting NAT translation table information into a protocol specific part of the SCSP CSA packet, comprises:
   a) inserting a local network address into a first field of the protocol specific part; and
   b) inserting a corresponding globally unique network address into a second field of the protocol specific part.

4. The method of claim 3, wherein the local and globally unique network addresses are Internet Protocol (IP) addresses.

5. The method of claim 3, wherein the local and globally unique network addresses are Internet Packet exchange (IPX) addresses.

6. The method of claim 3, further comprising:
   a) inserting a first Transport layer port number associated with the local network address in a third field of the protocol specific part; and
   b) inserting a second Transport layer port number associated with the globally unique network address into a fourth field of the protocol specific part.

7. The method of claim 6, further comprising:
   inserting a protocol identifier associated in a fifth field of the protocol specific part that identifies the Transport layer protocol with which the first and second transport layer port numbers are associated.

8. The method of claim 2, wherein inserting NAT translation table information into a protocol specific part of the SCSP CSA packet, comprises:
   a) inserting a first address into a first field of the protocol specific part; and
   b) inserting a corresponding second address into a second field of the protocol specific part.

9. The method of claim 8, wherein the first and second addresses are Internet Protocol (IP) addresses.

10. The method of claim 8, wherein the first and second addresses are Internet Packet exchange (IPX) addresses.

11. The method of claim 8, further comprising:
   a) inserting a first transport layer port number associated with the first address in a third field of the protocol specific part; and
   b) inserting a second Transport layer port number associated with the second address into a fourth field of the protocol specific part.

12. The method of claim 11, further comprising:
   inserting a protocol identifier in a fifth field of the protocol specific part that identifies the transport layer protocol with which the first and second transport layer port numbers are associated.

* * * * *